US005225106A

United States Patent [19]

Cox et al.

[11] Patent Number: 5,225,106

[45] Date of Patent: Jul. 6, 1993

[54] METHOD OF AND APPARATUS FOR GENERATING A FINE DISPERSION OF PARTICLES

[75] Inventors: William A. L. Cox; Michael J. Rose, both of Doncaster, England

[73] Assignee: Glass Bulbs Limited, Doncaster, England

[21] Appl. No.: 742,108

[22] Filed: Aug. 5, 1991

Related U.S. Application Data

[63] Continuation of Ser. No. 408,246, Sep. 18, 1989, abandoned.

[30] Foreign Application Priority Data

Sep. 16, 1988 [GB] United Kingdom ................ 8821771
Sep. 16, 1988 [GB] United Kingdom ................ 8821800

[51] Int. Cl.[5] ......................... B05D 1/06; C09K 3/30; G03G 15/08

[52] U.S. Cl. ................................... 252/305; 118/654; 427/565

[58] Field of Search ........................ 252/305; 102/334; 427/27, 565; 118/654

[56] References Cited

U.S. PATENT DOCUMENTS

| | | | |
|---|---|---|---|
| 2,364,199 | 12/1944 | Derr | 252/305 X |
| 2,437,963 | 3/1948 | Langmuir et al. | 252/305 |
| 2,725,304 | 11/1955 | Landrigan et al. | 118/654 X |
| 2,872,338 | 2/1959 | Landrigan et al. | 118/654 X |
| 3,513,011 | 5/1970 | Miller | 427/27 |
| 4,105,810 | 8/1978 | Yamazaki et al. | 427/255 X |
| 4,122,212 | 10/1978 | Walling et al. | 427/27 |
| 4,500,560 | 2/1985 | Guffroy | 427/27 X |
| 4,636,364 | 1/1987 | Geyer et al. | 252/305 X |

FOREIGN PATENT DOCUMENTS

| | | |
|---|---|---|
| 1421517 | 1/1976 | United Kingdom . |
| 2130906 | 6/1984 | United Kingdom . |

OTHER PUBLICATIONS

Patent Abstract of Japan (vol. 13, No. 107 (C-576) (3455) Mar. 14, 1989.

*Primary Examiner*—Richard D. Lovering
*Attorney, Agent, or Firm*—Keck, Mahin & Cate

[57] ABSTRACT

In an apparatus for generating a fine dispersion of particles in a gas, a body (47) for containing the gas has an inlet (59*a*, 59*b*) and an outlet (60) for passage of the particles. Nozzles (55) are provided to direct a plurality of jets of gas through the body (47). The body (47) is maintained at an elevated temperature by a heating element (49).

15 Claims, 1 Drawing Sheet

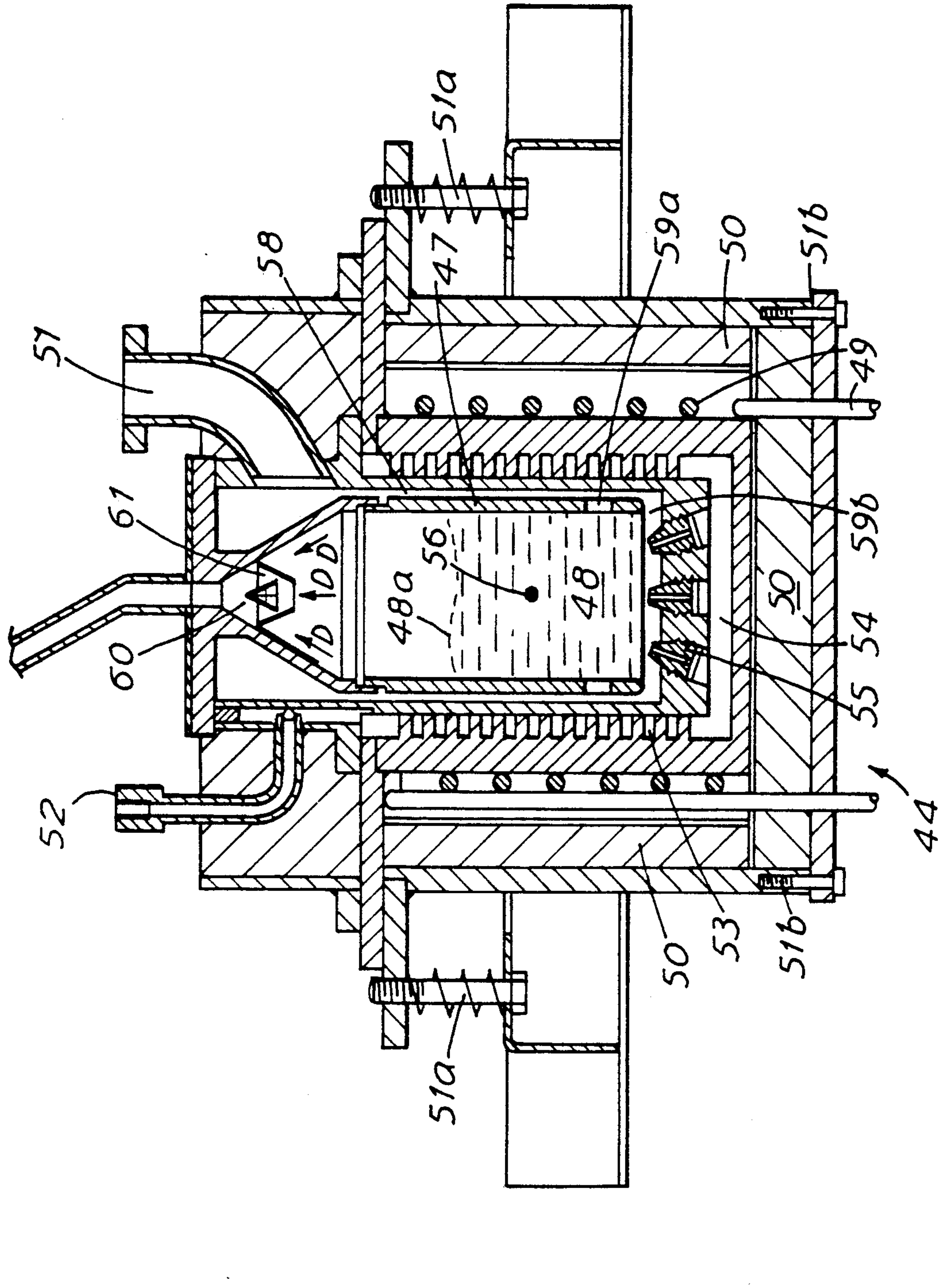
51
58
51a
47
59a
50
51b
49
61
56
48a
48
59b
60
D
54
55
52
44
53
51a
50
51b

METHOD OF AND APPARATUS FOR GENERATING A FINE DISPERSION OF PARTICLES

This application is a continuation of application Ser. No. 07/408,245, filed Sep. 18, 1989 (now abandoned).

The present invention relates to a method of and an apparatus for generating a fine dispersion of particles in a gas, the apparatus commonly being termed 'a smoke generator'. In particular, the present invention relates to a method of generating a fine dispersion of glass powder to be electrostatically deposited on the internal surface of a glass envelope for a lamp. The method and apparatus of the present invention are particularly suited for use with the method and apparatus for producing a light diffusing coating in a glass envelope as disclosed and claimed in our two copending European Patent Applications claiming priority respectively from GB Patent Application Nos. 8821771.6 and 8821800.3 and from GB Patent Application Nos. 8821777.3 and 8821800.3.

GB 1395437 (Philips) discloses an apparatus for electrostatically depositing powder on the inside surface of the envelope of a lamp which the powder to be deposited is mixed with a transport gas stream. In one embodiment, a container holding powder includes a mechanical stirrer positioned within the bulk of the powder by means of which a cloud of powder can be formed above the powder level.

Proposals to use a fluidised bed to create a fine suspension of dust powder an to turn that suspension into an aerosol are not new, GB 2130906A (NRDC) discloses an apparatus for dispensing dust suspensions to simulate industrial fume emissions such as occur in the iron and steelmaking industry. The apparatus includes a cylindrical vessel which is spanned by a perforated baffle. A bed of particles including deagglomerated dust particles and nickel spheres is formed upon the baffle. Dry and filtered air enters the vessel from below the baffle and passes through the baffle and bed of particles. This passage of air through the bed forms a rising suspension in air of fine particles elutriated (ie separated from the heavier particles) from the bed.

GB 1421517 (Interliz) discloses an apparatus for 'whirling-up' a powdery or granular material, such as magnesium oxide, in a vessel and for blowing it out of this vessel. One nozzle mounted in the upper end of the vessel is directed downwardly and substantially in the circumferential direction of the vessel. A further nozzle at the lower end is directed tangentially. Passage of air through the lower nozzle and into the powdery material causes the material to be loosened up, particularly at the surface, in the course of which a cloud of powder forms above the surface. This cloud is 'whirled-up' by air from the upper nozzle. Hot air at about 100° C. may be used to effect at least a partial drying of the material during the process, which is particularly beneficial for the hydroscopic magnesium oxide.

It is an object of the present invention to provide an improved method of and apparatus for generating a fine dispersion of particles in a gas.

According to a first aspect of the present invention there is provided a method of generating a fine dispersion of particles in a gas comprising the steps of:

maintaining a body containing the gas and the particles at an elevated temperature; and directing a plurality of jets of the gas through the particles.

The inventors surprisingly found that when the temperature of their apparatus for generating a fine dispersion of particles was increased from room temperature to 220° C., there was an approximately ten-fold in the mass of particles taken into suspension by a given mass of gas. This increase was much greater than could be explained by considering the thermal expansion of a constant mass of gas with increase in temperature. A similar increase of approximately tenfold was found in a subsequent test when the temperature of the apparatus was increased from room temperature to 100° C. The maximum temperature which could be used would be dependent on the properties of the powder to be put into suspension.

The powder used was a zinc borosilicate glass composition containing by weight 22% silicon dioxide ($SiO_2$), 31% boron oxide ($B_2O_3$), 27% zinc oxide (ZnO), 4% sodium oxide ($Na_2O$), 7% sodium fluoride (NaF), 5% potassium oxide ($K_2O$), 2% molybdenum oxide ($MoO_3$) and 2% tungsten oxide ($WO_3$) with the addition of 0.3% by weight of the free-flow aid Degussa D17. The powder was very finely divided with an average particle size of from 3 $\mu$m to 4 $\mu$m and a maximum particle size of 12 $\mu$m.

In a preferred embodiment, the plurality of jets are directed to converge at one or more points in the body containing the particles. This increase in efficiency of the method because of the turbulence produced in the bulk powder by the convergence of jets and also because it reduces the risk of a jet gas blowing straight through the bulk powder.

According to a second aspect of the present invention there is provided an apparatus for generating a fine dispersion of particles in a gas, the apparatus comprising:

a body for containing the gas, the body having an inlet and an outlet for passage of the particles;

means for directing a plurality of jets of gas through the body;

and means for maintaining the body at an elevated temperature.

BRIEF DESCRIPTION OF THE DRAWING

An embodiment of the present invention will now be described, by way of example only, and with reference to the accompanying FIGURE which shows a sectional view through the embodiment.

A smoke generator assembly 44 has a main body 47 for containing glass powder 48 and gas. A metal clad heating element 49 surrounds the body 47, maintaining the body 47 and its contents at an elevated temperature the whole being surrounded by heat insulation 50. Springs 51*a*, 59*b* are provided to enable the assembly to be vibrated during operation.

Pressurized air is fed into the smoke generator via an inlet 52 and a spiral groove 53 that runs around the outside of the main body 47. Passage of air through the groove 53 allows the air to be preheated to an elevated temperature prior to its injection into the main body 47 via a manifold 54 and nozzles 55. The FIGURE shows three nozzles 55 directed towards a point 56. The number of nozzles 55, their arrangement and so the number of points 56 provided in a generator assembly depends on the configuration of the generator.

Fresh spray powder is metered into the top of the generator at an inlet 57. The power passes down ia channel 58 outside the body 47 due to vibration of the assembly and is heated by conduction of heat through melt parts of the spiral groove 53. The powder is drawn into the body 47 via inlets 59a, 59b due to flow patterns caused by air from the nozzles 55.

The point 56 to which the nozzles 55 are directed is termed a 'boil' point and is positioned about two thirds the way up towards the bulk powder level (indicated by a dotted line 48a). In operation, convergence of jets of air from the nozzles 55 at the 'boil' point 56 produces a fine dispersion of powder particles in air, termed a 'smoke' which moves towards an outlet 60 as indicated by the arrows D. A plurality of baffles 61 regulates the passage of the 'smoke' out of the body 47, improving the uniformity of the density of the 'smoke' generated by preventing localised high concentrations of powder such as may arise from the 'boil' from exiting the body 50. The baffles 61 also prevent any agglomerates or large extraneous particles from exiting the body 47.

As already indicated, the design of the generator is directed towards maintaining the body 47, powder 48 and gas at an elevated temperature. To this effect, the gas and powder are preferably pre-heated prior to their introduction into the body 47. It has been found that an elevated temperature of 220° C. has a surprisingly beneficial effect on the smoke which can be produced. Another consideration to be taken into account is the use to which the smoke will be put.

The air pressure maintained in the manifold 54 depend son the density of smoke desired, the temperature of the generator and the number and size of the nozzles 55. It is anticipated that in the majority of applications, the air pressure used would be less than one atmosphere (in excess of ambient pressure).

The arrangement of nozzles 55 within the body 47 is affected by the number of outlets 60 required. A generator with a single outlet would typically be of a cylindrical design and have seven nozzles mounted in the base, six arranged hexagonally about a central nozzle. A generator with multiple outlets would typically be of a rectangular design with the number of nozzles determined by its length.

A variety of modifications are envisaged. Larger generator assemblies may be provided with some form of mechanical stirring. If the powder used is not very fluid, a metered dose of heavier particles (preferably of spherical shape) may be placed in the body 47 to assist in maintaining the homogenity of the bulk powder. Furthermore, one or both of the gas and powder may be preheated independently of the smoke generator prior to their introducing into the smoke generator assembly. It is envisaged that control of both the concentration of powder in the gas and the total flow rate of the suspension can be varied widely and independently of each other by varying parameters such as temperature, pressure, nozzle diameter, depth of bulk powder and rate of feed of powder into the body.

It is envisaged that the present invention may have wider applications, e.g. generating suspensions of enamel powder for dry enamelling of metals or external enamelling of glass envelopes or in the plastics coating of metal components.

We claim:

1. Method for improving uniformity in the amount of solid particles entrained in a gas discharged from a top surface of a fluidized bulk of particles in a smoke generator, comprising the steps:

introducing gas through a plurality of nozzles at the bottom of the bulk of particles to provide upwardly directed gas jets within the bulk to maintain the bulk of particles in a homogeneous, turbulent fluidized state;

discharging the gas entraining such solid particles from the top surface of the fluidized bulk of particles;

directing the gas jet to intersect each other within the fluidized bulk at one or more locations sufficiently below the top surface of the bulk to prevent the jets form streaming through the bulk for improving uniformity in the amount of solid particles entrained in the gas discharged from the top of the bulk; and maintaining the fluidized bulk of particles at an elevated temperature for increasing the amount of such dry particles entrained in the gas discharged from the top surface of the bulk.

2. A method according to claim 1 wherein gas supplied to the body is preheated to said elevated temperature.

3. A method according to claim 1 wherein the gas is air.

4. A method according to claim 1 wherein the body is vibrated at a low frequency.

5. A method according to claim 1 wherein the passage of particles out of the body is regulated.

6. The method of claim 1, in which all the jets are directed toward one or more points approximately two-thirds the way up from the bottom toward the top surface of the fluidized bulk of particles.

7. Method for increasing the amount of fine dry particles entrained in a gas discharged from a top surface of a fluidized bulk of particles in a smoke generator, comprising the steps:

metering into the bulk fine dry particles of a material for increasing entrainment of the dry particles in the gas discharged from the top surface of the fluidized bulk when temperature of the smoke generator is increased from room temperature to an elevated operating temperature substantially above room temperature;

directing gas from a bottom of the bulk, upward through the bulk to maintain the bulk particles in a homogeneous, turbulent fluidized state;

discharging the gas entraining such dry particles from the top surface of the bulk; and directing the gas jet to intersect each other within the fluidized bulk at one or more location sufficiently below the top surface of the bulk to prevent the jets from streaming through the bulk for improving uniformity in the amount of solid particles entrained in the gas discharged from the top of the bulk;

maintaining the fluidized bulk of particles at the elevated temperature for increasing the amount of such dry particles entrained in the gas discharged from the top surface of the bulk.

8. The method of claim 7, in which the elevated temperature is above 100° C.

9. The method of claim 7, in which the elevated temperature is approximately 220° C.

10. The method of claim 7, in which the elevated temperature selection is dependent on the properties of the dry particle material.

11. The method in claim 7, in which the dry particles are of zinc borosilicate glass composition.

12. Apparatus for generating a dispersion of fine, solid particles entrained in a gas, comprising:

body means for containing a fluidized bulk of particles;

metering means for introducing the fine, solid particles into the bulk of particles within such body means;

distribution means for introducing gas into the bottom of the bulk, for providing upward directed gas in the bulk to maintain the bulk of particles in a turbulent, homogeneous, fluidized state and for entraining a uniform amount of the fine, solid particles dispersed in the gas discharged from a top surface of the fluidized bulk, and which includes, nozzle means for directing jets of gas through the bulk toward the top surface and for directing such jets to intersect each other within the fluidized bulk at one or more locations sufficiently below the top surface of the bulk for preventing the jets from streaming through the bulk for increasing the amount and improving uniformity in the amount of said fine, solid particles entrained in the discharged gas;

path means for conducting the gas, discharged from the top surface of the fluidized bulk of particles and in which the fine, solid particles are entrained, out of such body means; and means for maintaining the fluidized bulk of particles at an elevated temperature for increasing the amount of such dry particles entrained in the gas discharged from the top surface of the bulk.

13. An apparatus according to claim 12 further comprising means for vibrating the body at a low frequency.

14. An apparatus according to claim 12 further comprising means for regulating passage of particles out of the body.

15. The apparatus of claim 12, further including, baffle means positioned above the top surface of the bulk of particles within such body means and communicating with such path means for improving uniformity in size and amount of the fine, solid particles entrained in the gas conducted through such path means.

* * * * *